United States Patent
Nakayama et al.

(10) Patent No.: US 6,889,805 B2
(45) Date of Patent: May 10, 2005

(54) CLUTCH HYDRAULIC MECHANISM

(75) Inventors: Hideo Nakayama, Osaka (JP); Mamoru Kobayashi, Osaka (JP); Eiichi Sakai, Osaka (JP)

(73) Assignee: TCM Corporation, Osaka (JP)

( * ) Notice: Subject to any disclaimer, the term of this patent is extended or adjusted under 35 U.S.C. 154(b) by 0 days.

(21) Appl. No.: 10/202,709

(22) Filed: Jul. 24, 2002

(65) Prior Publication Data

US 2004/0016615 A1 Jan. 29, 2004

(51) Int. Cl.[7] .............................................. B60K 41/22
(52) U.S. Cl. ................. 192/3.61; 192/48.7; 192/109 F
(58) Field of Search ............................. 192/3.61, 48.7, 192/109 F

(56) References Cited

U.S. PATENT DOCUMENTS

| | | | | |
|---|---|---|---|---|
| 4,996,894 A | * | 3/1991 | Holbrook et al. .............. | 477/62 |
| 5,247,858 A | * | 9/1993 | Niiyama ..................... | 477/116 |
| 5,249,655 A | * | 10/1993 | Person ...................... | 192/17 A |
| 5,383,379 A | * | 1/1995 | Niiyama ..................... | 74/733.1 |
| 5,521,818 A | * | 5/1996 | Palansky et al. .............. | 701/62 |

* cited by examiner

*Primary Examiner*—Saul Rodriguez
(74) *Attorney, Agent, or Firm*—Fildes & Outland, P.C.

(57) ABSTRACT

A check valve is installed in a hydraulic line for hydraulic oil to be fed to a forward movement hydraulic clutch, while an accumulator for accumulating some amount of the hydraulic oil fed to the hydraulic clutch is installed between the check valve and the hydraulic clutch. Further installed is a control spool that is operated by the hydraulic oil fed to the forward movement hydraulic clutch and that cooperates with the check valve to hold the hydraulic oil accumulated in the accumulator. According to this arrangement, even if the oil pressure drops momentarily due to a speed gear shift, the pressure for the hydraulic clutch before the gear shift is held by the hydraulic oil accumulated in the accumulator. Thus, a delay in torque restoration due to a slip of the hydraulic clutch can be eliminated, so that an operator can be freed from having a feeling of torque loss or a shock, and a feeling of uneasiness such as a feeling of reversing on an uphill slope, during the gear shift.

1 Claim, 10 Drawing Sheets

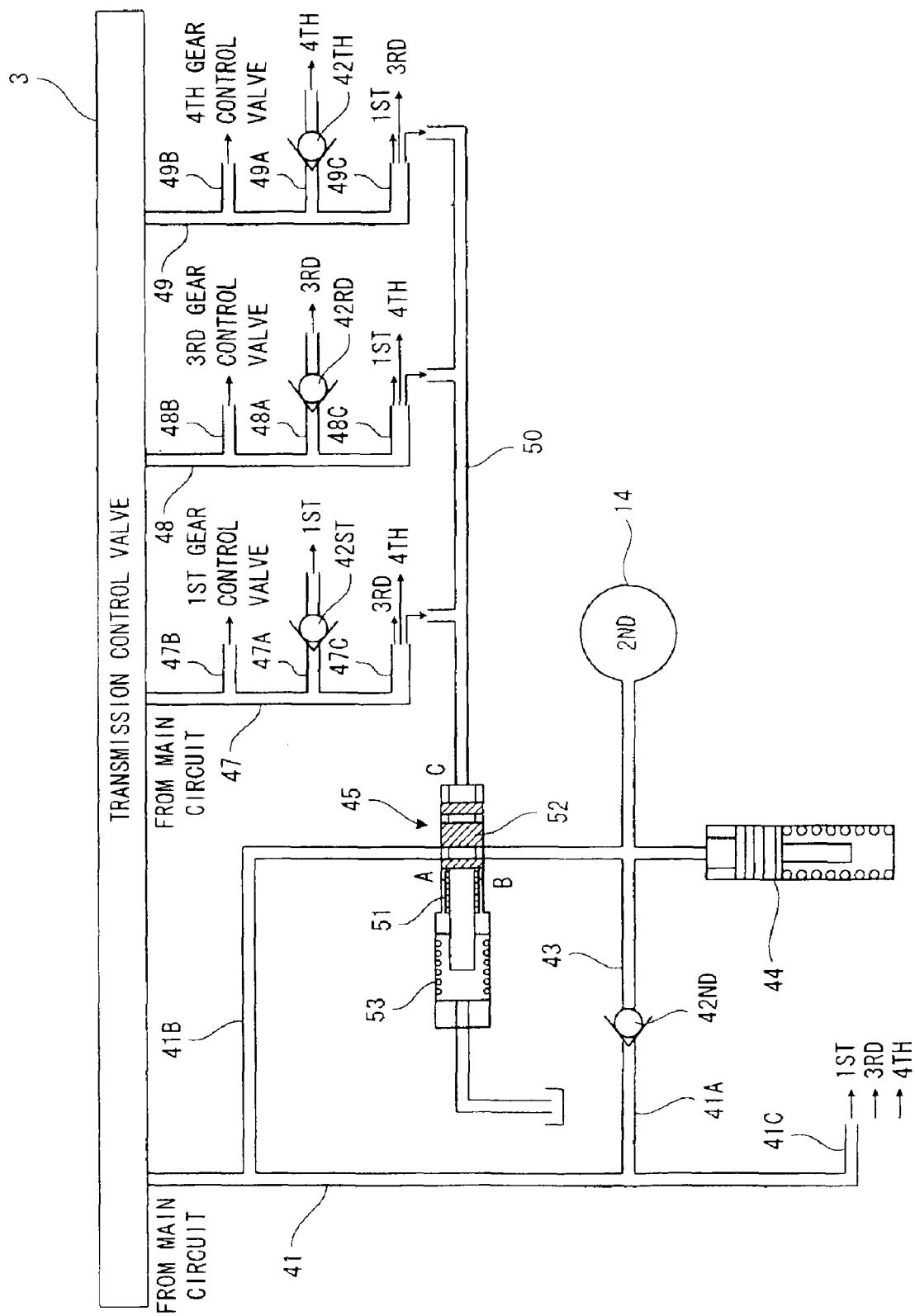

WHEN THERE IS AN ORIFICE

WHEN THERE IS NO ORIFICE

CLUTCH HYDRAULIC MECHANISM

FIELD OF THE INVENTION

The present invention relates to a clutch hydraulic mechanism for industrial trucks using torque converters.

BACKGROUND OF THE INVENTION

An industrial truck using a torque converter includes, corresponding to the clutch operating lever positions (forward movement/rearward movement/1st gear/2nd gear/3rd gear/4th gear), two groups of hydraulic clutches, namely, a group of forward/rearward movement hydraulic clutches (a forward movement hydraulic clutch and a rearward movement hydraulic clutch), and a group of speed gear hydraulic clutches (a 1st gear hydraulic clutch, a 2nd gear hydraulic clutch, a 3rd gear hydraulic clutch, and a 4th gear hydraulic clutch), so that the direction of travel and speed gear are set by the engagement of respective hydraulic clutches selected one from each group, thus effecting the change of direction and speed of the truck.

A publicly known clutch hydraulic mechanism for feeding hydraulic oil to these hydraulic clutches is provided with a control valve for selectively feeding hydraulic oil to each said hydraulic clutches in response to the operating signals from the clutch operating lever (forward movement/rearward movement/1st gear/2nd gear/3rd gear/4th gear), so that the direction change and gear shift of the truck are effected by selectively feeding hydraulic oil from the control valve to the hydraulic clutches.

Further, in this control valve, the clutch oil pressure increasing time (clutch oil pressure waveform) is changed according to each speed gear (1st gear/2nd gear/3rd gear/4th gear) to make gear shifts smooth. In effecting a gear shift operation, the clutch oil pressure for the speed gear hydraulic clutch before the gear shift is quickly brought back to zero and then the clutch oil pressure for the speed gear hydraulic clutch after the gear shift is gradually increased to complete the gear shift.

In the conventional transmission mechanism described above, however, (1) there is a substantial amount of time needed from the time the clutch oil pressure for the speed gear hydraulic clutch before a gear shift is reduced to almost zero until the clutch oil pressure for the speed gear hydraulic clutch after the gear shift is increased to provide a sufficient torque to the truck, and (2) when a gear shift operation is effected, the clutch oil pressure in the entire circuit momentarily drops, so that the forward or rearward movement hydraulic clutch that does not need to be turned on or off has its clutch oil pressure momentarily dropping, accompanied by a clutch slip, and then rising again, the slip retarding the recovery of torque after the gear shift. These two factors cause a loss in the output shaft torque during a gear shift operation, arousing a feeling of torque loss or a shock, and a feeling of uneasiness such as a feeling of reversing on an uphill slope, in an operator during the gear shift.

A publicly known example will be later described in detail using drawings.

DISCLOSURE OF THE INVENTION

Accordingly, an object of the invention is to provide a clutch hydraulic mechanism capable of solving these problems and preventing the operator from having a feeling of uneasiness during a gear shift.

To achieve this object, the invention provides a clutch hydraulic mechanism for switching between forward and rearward movement hydraulic clutches corresponding to an operation of a clutch operating lever, the mechanism being employed in industrial trucks using torque converters, wherein the improvement comprises: a check valve provided for each of the hydraulic, the check valve being installed in a hydraulic line for hydraulic oil being fed to the hydraulic clutch; an accumulator provided for each of the hydraulic clutches, the accumulator being disposed between the check valve and the hydraulic clutch and accumulating some amount of the hydraulic oil therein so as to prevent hydraulic clutch from losing hydraulic pressure when a speed gear hydraulic clutch is shifted to another gear; and a control spool provided for each of the hydraulic clutches, the control spool being operated by the hydraulic oil fed to the hydraulic clutch and cooperating with the check valve to hold the hydraulic oil accumulated in the accumulator.

According to such arrangement, some amount of the hydraulic oil fed to the forward or rearward movement hydraulic clutch is accumulated in the accumulator through the check valve, and held by the check valve and control spool, so that even if the oil pressure drops momentarily by a speed gear shift operation, the pressure for the forward or rearward movement hydraulic clutch before the gear shift can be held by the hydraulic oil accumulated in the accumulator. Thus, a slip of the forward or rearward movement hydraulic clutch during a speed gear shift operation can be prevented, and a decrease in output shaft torque (torque loss) be prevented, allowing it to eliminate a feeling of torque loss, a shock, and a feeling of uneasiness such as a feeling of reversing on an uphill slope, which an operator has had during a gear shift.

BRIEF DESCRIPTION OF THE DRAWINGS

FIG. 3 is a hydraulic circuit diagram of a transmission provided with a clutch hydraulic mechanism in a second embodiment of the invention;

DESCRIPTION OF THE EMBODIMENTS

Before describing embodiments of the invention, a publicly known embodiment will first be described in more detail using FIGS. 9, 10 and 2*a*.

Figure 9:
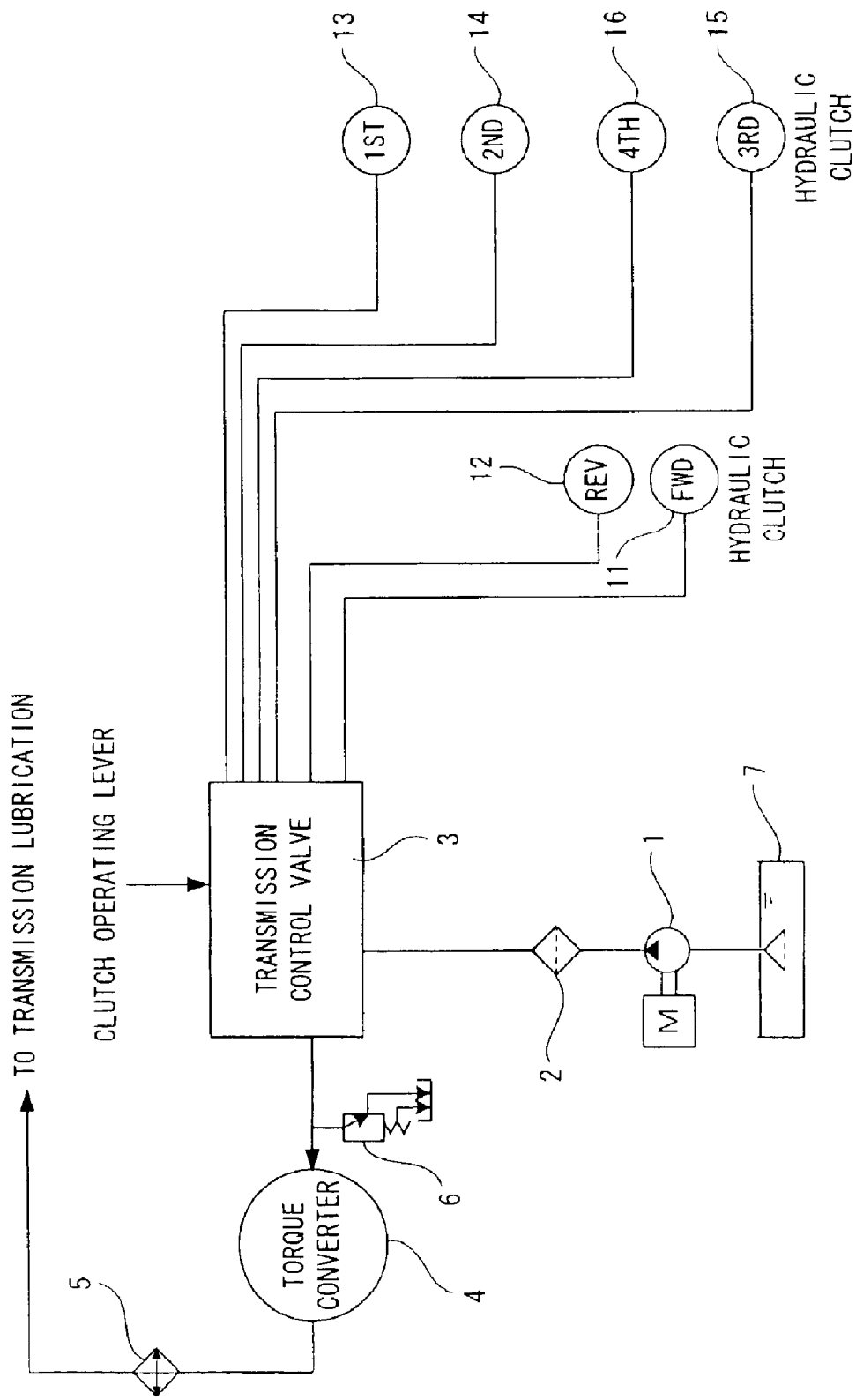
FIG. 9 is a hydraulic circuit diagram of a conventional transmission.

In FIG. 9, the numeral 1 denotes a charging pump (oil pump), wherein the hydraulic oil delivered from the charging pump 1 has its pressure adjusted by a transmission control valve 3 through a line filter 2 and then it is fed to a torque converter 4, cooled by an oil cooler 5, and used as lubricating oil for a transmission mechanism. Further, a safety valve 6 is installed at the inlet to the torque converter 4. Further, in FIG. 9, the numeral 7 denotes a transmission sub-tank (oil tank).

Further, hydraulic clutches corresponding to the clutch operating lever positions, i.e., forward movement/rearward movement/1st gear/2nd gear/3rd gear/4th gear, i.e., a forward movement (FWD) hydraulic clutch 11, a rearward movement (REV) hydraulic clutch 12, a 1st gear (1ST) hydraulic clutch 13, a 2nd gear (2ND) hydraulic clutch 14, a 3rd gear (3RD) hydraulic clutch 15, and a 4th gear (4TH) hydraulic clutch 16 are provided. In a torque converter type transmission, the traveling direction and speed gear are set by engagement of the following two clutches;

(1) forward movement hydraulic clutch 11 or rearward movement hydraulic clutch 12, and (2) speed gear hydraulic clutch 13, 14, 15 or 16.

The transmission control valve 3 has a regulator for adjusting the pressure of the hydraulic oil as described above and feeding it to the torque converter 4, and a valve main body and a plurality of solenoid valves for selectively feeding the hydraulic oil to the hydraulic clutches to effect the direction change and gear shift of the truck.

Figure 10:
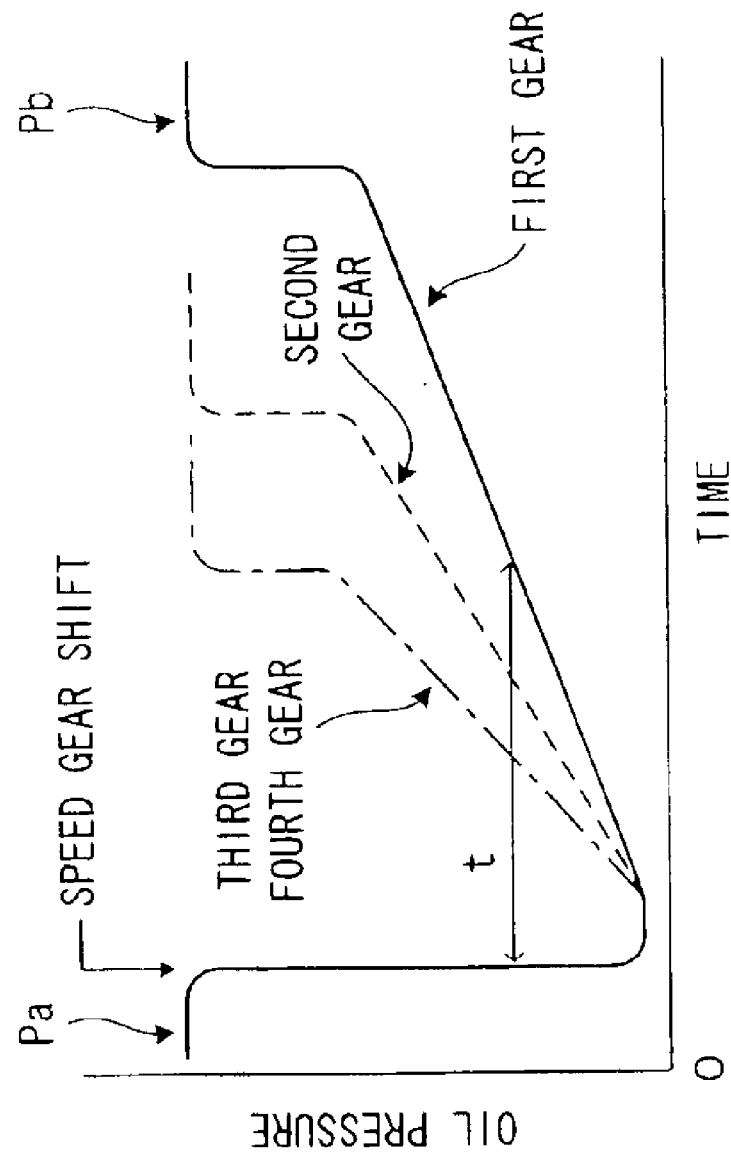
FIG. 10 is a characteristics diagram of clutch oil pressure in the conventional transmission.

The module mechanism of the valve, as shown in FIG. 10, changes the clutch oil pressure increasing time (clutch oil pressure waveform) according to each speed gear to make a gear shift smooth, it being arranged that when a gear shift operation is to be effected, the clutch oil pressure Pa for a speed gear hydraulic clutch before a gear shift is quickly brought back to zero, and then the clutch oil pressure Pb for the speed gear hydraulic clutch after the gear shift is gradually increased to complete the gear shift.

With the conventional transmission mechanism, however, there is substantial time t, as shown in FIG. 10, needed from the time the clutch oil pressure Pa for the speed gear hydraulic clutch before a gear shift is reduced almost to zero until the oil pressure Pb for the speed gear hydraulic clutch after the gear shift is increased to provide a sufficient torque to the truck. Further, at this time, since the clutch oil pressure in the entire circuit momentarily drops, the forward movement hydraulic clutch 11 or reverse movement hydraulic clutch 12 that does not need to be turned on or off, as shown in FIG. 2a, has its clutch oil pressure momentarily dropping, accompanied by a slip, and then rising again, the slip sometimes retarding the recovery of torque after the gear shift.

Figure 2A:
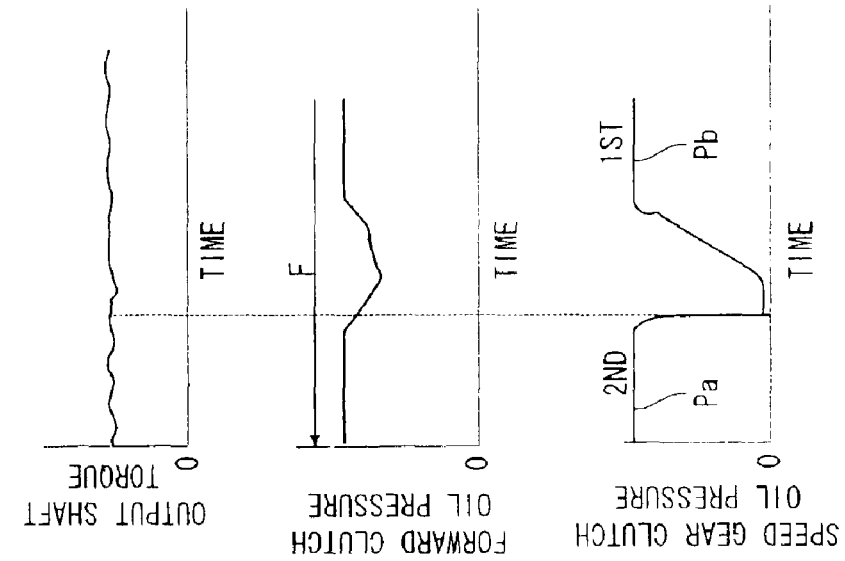
FIG. 2 is a characteristics diagram of clutch oil pressure versus output shaft torque in the clutch hydraulic mechanism.

The existence of the time t and the delay in torque recovery due to the slip of the forward movement hydraulic clutch 11 or reverse movement hydraulic clutch 12, as shown in FIG. 2a, have caused a loss of output shaft torque, arousing a feeling of torque loss in the operator or giving a shock during a gear shift or a feeling of uneasiness such as a feeling of reversing on an uphill slope.

The invention is intended to solve such problems.

Embodiments of the invention will now be described with reference to the drawings. In addition, the same parts as those shown in FIG. 9 showing the publicly known example are given the same reference characters, and a description thereof is omitted.

(First Embodiment)

Figure 1:
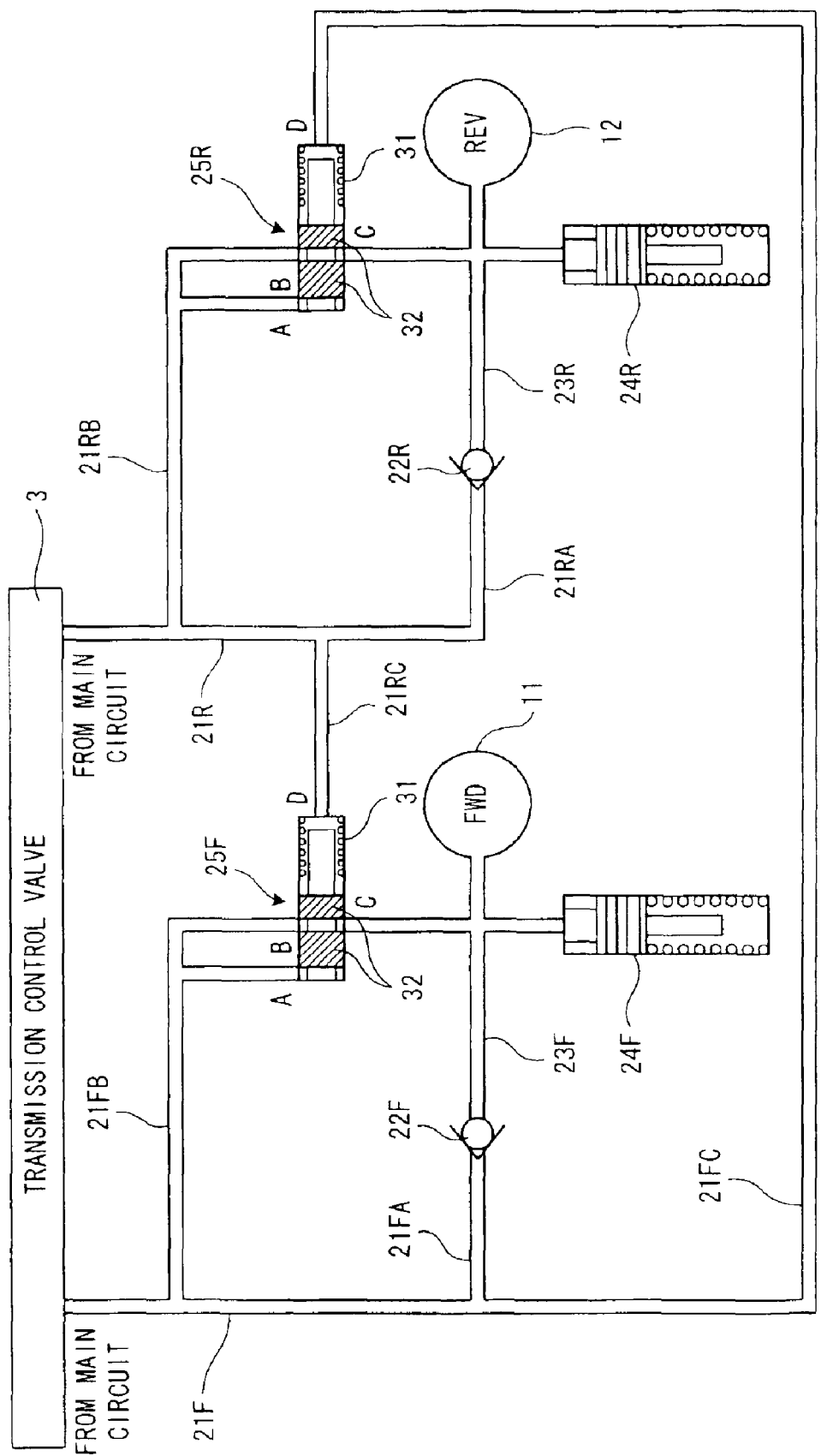
FIG. 1 is a hydraulic circuit diagram of a transmission provided with a clutch hydraulic mechanism in a first embodiment of the invention.

FIG. 1 shows a transmission hydraulic circuit provided with a clutch hydraulic mechanism in the first embodiment of the invention.

FIG. 1 shows the clutch hydraulic mechanism for the forward movement hydraulic clutch 11 and reverse movement hydraulic clutch 12.

A hydraulic line 21F through which hydraulic oil is fed from the transmission control valve 3 to the forward movement hydraulic clutch 11 is divided into three. A first hydraulic line 21FA has a check valve 22F connected thereto, the check valve 22F having a hydraulic line 23F connected thereto, the hydraulic line 23F having the forward movement hydraulic clutch 11 connected thereto.

Further, disposed in the hydraulic line 23F (and between the check valve 22F and the forward movement hydraulic clutch 11) is an accumulator 24F for accumulating some amount of the hydraulic oil fed to the hydraulic clutch 11.

Further, a second hydraulic line 21FB is further divided into two, which are connected to the ports A and B of a control spool 25F, and the port C of a control spool 25F is connected to the hydraulic line 23F.

Further, a hydraulic line 21R through which hydraulic oil is fed from the transmission control valve 3 to the reverse movement hydraulic clutch 12 is divided into three. A first hydraulic line 21RA has a check valve 22R connected thereto, the check valve 22R having a hydraulic line 23R connected thereto, the hydraulic line 23R having the reverse movement hydraulic clutch 12 connected thereto.

Further, disposed in the hydraulic line 23R (and between the check valve 22R and the reverse movement hydraulic clutch 12) is an accumulator 24R for accumulating some amount of the hydraulic oil fed to the hydraulic clutch 12.

Further, a second hydraulic line 21RB is further divided into two, which are connected to the ports A and B of a control spool 25R, and the port C of a control spool 25R is connected to the hydraulic line 23R.

And, connected to the port D of a control spool 25F for forward movement is a third hydraulic line 21RC for reverse movement, and connected to the port D of the control spool 25R for reverse movement is a third hydraulic line 21FC for forward movement.

The control spools 25F and 25R are arranged such that normally the passageway between the ports B and C is opened but application of oil pressure to the port A moves a spool 32 against a spring 31 to close the passageway between the ports B and C, while disappearance of oil pressure allows the spool 32 to return under the action of the spring 31 or application of oil pressure to the port D returns the spool 32, again opening the passageway between the ports B and C.

Operation of the above arrangement will now be described.

In the case where the speed is changed from reverse movement to forward movement, the hydraulic oil from the transmission control valve 3 is fed to the forward movement hydraulic clutch 11 to increase the pressure for the forward movement hydraulic clutch 11 while filling the accumulator 24F through the hydraulic lines 21F and 21FA, check valve 22F and hydraulic line 23F. Further, hydraulic oil is fed to the port A of the control spool 25F through the hydraulic lines 21F and 21FB; thus, the spool 32 is moved against the spring 31 to close the passageway between the ports B and C, that is, the spool 32 closes the port C, closing the hydraulic line 23F. Further, simultaneously therewith, hydraulic oil is fed to the port D of the control spool 25R for forward movement through the hydraulic lines 21F and 21FC; thus, application of oil pressure to the port D opens the passageway between the ports B and C of the control spool 25R, so that the hydraulic oil fed to the reverse movement hydraulic clutch 12 is returned to the transmission control valve 3 through the hydraulic line 23R, the passageway between the ports B and C, and the lines 21RB and 21R; therefore, the oil pressure for the reverse movement hydraulic clutch 12 becomes zero. In this manner, the hydraulic oil from the transmission control valve 3 is fed to the forward movement hydraulic clutch 11, whereby the clutch is shifted from reverse movement to forward movement.

Figure 2B:
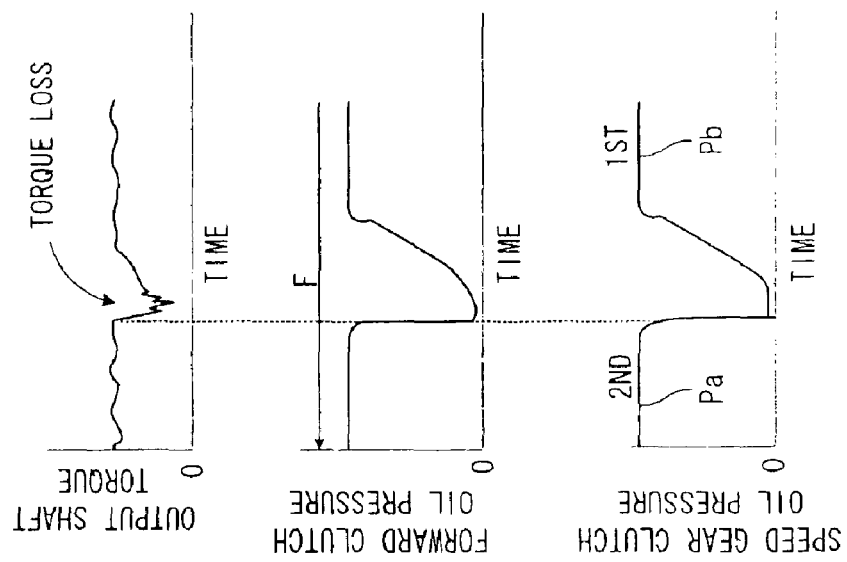

In this state, when a gear shift by means of the speed gear hydraulic clutches (1st gear/2nd gear/3rd gear/4th gear) 13–16 is effected, for example, from 2nd gear to 1st gear, as shown in FIG. 2b, the oil pressure of hydraulic oil being fed to the forward movement hydraulic clutch 11 momentarily drops, but the oil pressure for the forward movement hydraulic clutch 11 is blocked by the check valve 22F and by the spool 32 of the control spool 25F and is held by the working of the accumulator 24F.

In addition, the spring 31 is set at a suitable small spring force sufficient to prevent the spool 32 from returning under the momentary oil pressure drop.

Further, when a gear shift is effected from forward movement to reverse movement, the hydraulic oil from the transmission control valve 3 is fed to the reverse movement hydraulic clutch 12 through the hydraulic lines 21R, 21RA, check valve 22R, and hydraulic line 23R, to increase the pressure for the reverse movement hydraulic clutch 12. Further, hydraulic oil is fed to the port A of the control spool 25R through the hydraulic lines 21R and 21RB, so that the spool 32 is moved against the spring 31 to close the passageway between the ports B and C, that is, the spool 32 closes the port C, closing the hydraulic line 23R. Further, simultaneously therewith, hydraulic oil is fed to the port D of the control spool 25F for forward movement through the hydraulic lines 21R and 21RC, so that application of oil pressure to the port D returns the spool 32, again opening the passageway between the ports B and C, so that the hydraulic oil fed to the forward movement hydraulic clutch 11 is returned to the transmission control valve 3 through the hydraulic line 23F, the passageway between the ports B and C, and lines 21FB and 21F, with the oil pressure for the forward movement hydraulic clutch 11 becoming zero. In this manner, hydraulic oil is fed from the transmission control valve 3 to the reverse movement hydraulic clutch 12, whereby the clutch is switched from forward movement to reverse movement.

In such state, as in the case of the forward movement hydraulic clutch 11, the oil pressure for the reverse movement hydraulic clutch 12 is held even if a gear shift is effected by means of the speed gear hydraulic clutches (1st gear/2nd gear/3rd gear/4th gear) 13–16.

According to the above action, the momentary drop in oil pressure of hydraulic oil that develops when a gear shift is effected by means of the speed gear hydraulic clutches (1st gear/2nd gear/3rd gear/4th gear) 13–16 prevents a drop in the oil pressure for the forward movement hydraulic clutch 11 or reverse movement hydraulic clutch 12; therefore, the delay in torque restoration due to a slip of the forward movement hydraulic clutch 11 or reverse movement hydraulic clutch 12 can be eliminated, that is, a drop in output shaft torque (torque loss) can be prevented. Thus, a feeling of torque loss or a shock, and a feeling of uneasiness such as a feeling of reversing on an uphill slope, which have heretofore been given to an operator during a gear shift, can be eliminated.

(Second Embodiment)

In the first embodiment described above, the problem of toque loss due to a momentary drop in hydraulic oil pressure during a gear shift has been dealt with by preventing the oil pressure for the forward movement hydraulic clutch 11 or reverse movement hydraulic clutch 12 from dropping. In the second embodiment, however, torque loss is prevented by avoiding the phenomenon of the oil pressure of the hydraulic oil momentarily dropping almost to zero during the gear shift.

FIG. 3 shows a hydraulic circuit for a transmission provided with a clutch hydraulic mechanism according to the second embodiment of the invention.

FIG. 3 shows the clutch hydraulic mechanism of a second gear (2ND) hydraulic clutch 14. In addition, the other first gear (1ST) hydraulic clutch 13, third gear (3RD) hydraulic clutch 15, and forth gear (4TH) hydraulic clutch 16 are of similar construction.

A hydraulic line 41 through which hydraulic oil is fed from the transmission control valve 3 to the second gear hydraulic clutch 14 is divided into three. A first hydraulic line 41A has a check valve 42ND connected thereto, the check valve 42ND having a hydraulic line 43 connected thereto, the hydraulic line 43 having the second gear hydraulic clutch 14 connected thereto.

Further, disposed in the hydraulic line 43 (and between the check valve 42ND and the speed gear hydraulic clutch) is an accumulator 44 for accumulating some amount of the hydraulic oil fed to the second gear hydraulic clutch 14.

Further, the second hydraulic line 41B is connected to the port A of the control spool 45; the port B of the control spool 45 is connected to the hydraulic line 43; and the port C of the control spool 45 is connected to the hydraulic line 50. Further, the third hydraulic line 41C is connected to hydraulic lines (not shown) leading to the ports C of respective control spools for the first gear hydraulic clutch 13, third gear hydraulic clutch 15 and fifth gear hydraulic clutch 16, in such a manner that their respective portions of hydraulic oil do not interfere with each other.

Further, each hydraulic line 47 through which hydraulic oil is fed from the transmission control valve 3 to the first gear hydraulic clutch 13 is likewise divided into three. A first hydraulic line 47A is connected to the first gear hydraulic clutch 13 through the check valve 42ST; a second hydraulic line 47B is connected to the port C of a control spool (not shown); and a third hydraulic line 47C is connected to a hydraulic line 50 leading to the port C of the second gear hydraulic clutch 14 and to a hydraulic line (not shown) leading to the ports C of the control spools for the third gear hydraulic clutch 15 and fourth gear hydraulic clutch 16, in such a manner that the respective portions of the hydraulic oil do not interfere with each other.

Further, each hydraulic line 48 through which hydraulic oil is fed from the transmission control valve 3 to the third gear hydraulic clutch 15 is likewise divided into three. A first hydraulic line 48A is connected to the third gear hydraulic clutch 15 through the check valve 42RD; a second hydraulic line 48B is connected to the port C of a control spool (not shown); and a third hydraulic line 48C is connected to a hydraulic line 50 leading to the port C of the second gear hydraulic clutch 14 and to a hydraulic line (not shown) leading to the ports C of the control spools for the first gear hydraulic clutch 13 and fourth gear hydraulic clutch 16, in such a manner that the respective portions of the hydraulic oil do not interfere with each other.

Further, each hydraulic line 49 through which hydraulic oil is fed from the transmission control valve 3 to the fourth gear hydraulic clutch 16 is likewise divided into three. A first hydraulic line 49A is connected to the fourth gear hydraulic clutch 16 through the check valve 42TH; a second hydraulic line 49B is connected to the port C of a control spool (not shown); and a third hydraulic line 49C is connected to a hydraulic line 50 leading to the port C of the second gear hydraulic clutch 14 and to a hydraulic line (not shown) leading to the ports C of the control spools for the first gear hydraulic clutch 13 and third gear hydraulic clutch 15, in such a manner that the respective portions of the hydraulic oil do not interfere with each other.

In the control spool 45, the passageway between then ports A and B is normally open, but when oil pressure is applied to the port C, first the spool 52 is moved against the first spring 51 to close the passageway between the ports A and B and when the oil pressure on the port C increases, the spool 52 is further moved against the first and second springs 51 and 53 to reopen the passageway between the ports A and B. Further, when oil pressure to the port C disappears, the springs 51 and 53 force the spool 52 to return, thus opening the passageway between the ports A and B.

Operation of the above arrangement will now be described.

In the case where speed is changed to the second gear, the hydraulic oil from the transmission control valve 3 is fed to the second gear hydraulic clutch 14 while filling the accumulator 44 through the hydraulic lines 41 and 41A, check valve 42ND and hydraulic line 43, thereby increasing the pressure for the second gear hydraulic clutch 14.

In this state, if the speed is changed to the first gear, for example, the hydraulic oil from the transmission control valve 3 is fed to the first gear hydraulic clutch 13 through the hydraulic lines 47 and 47A, and check valve 42ST, thus increasing the pressure for the first gear hydraulic clutch 13 to change speed to the first gear. Further, simultaneously therewith, hydraulic oil is fed to the port C of the control spool 45 for the second gear hydraulic clutch 14 through the hydraulic lines 47, 47C and 50, and when oil pressure is applied to the port C, even a low oil pressure (e.g., 2 kg/cm$^2$) existing in the initial phase of modulation cause the spool 52 to move swiftly against the force of the spring 51, because the latter has been set weakly, so that the passageway between the ports A and B is closed, that is, spool 52 closes the port B, closing the hydraulic line 43.

Figure 4:
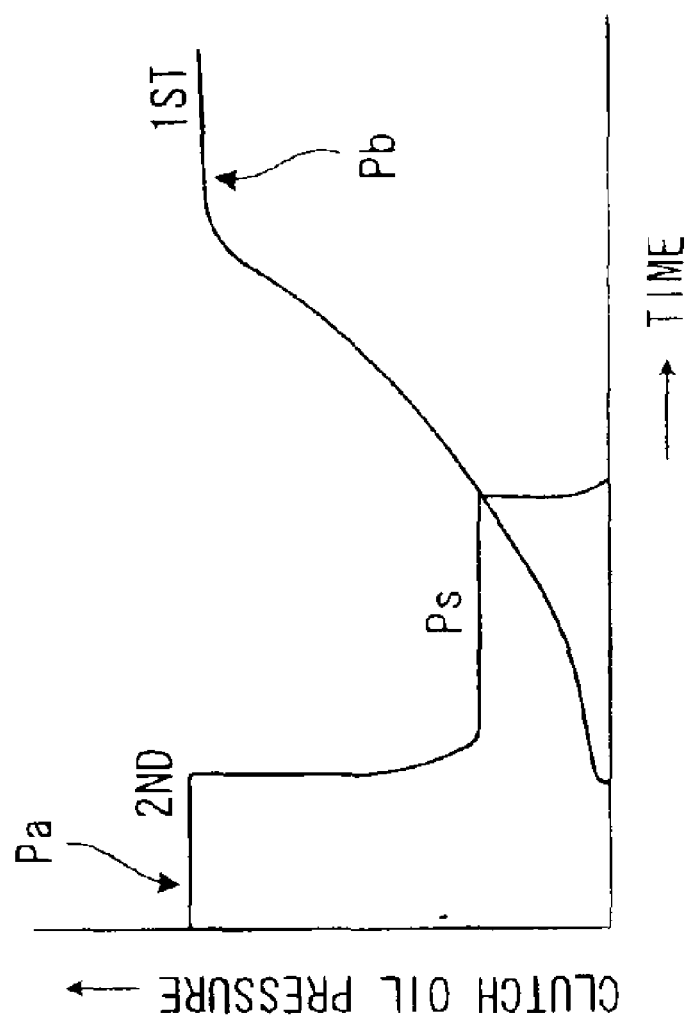
FIG. 4 is a characteristics diagram of clutch oil pressure in the clutch hydraulic mechanism.

Thereupon, the hydraulic oil fed to the second gear hydraulic clutch 14 has its escape route cut off by the check valve 42ND and the spool 52 of the control spool 45, so that a shelf-like oil pressure waveform Ps shown in FIG. 4 is formed by the set pressure of the accumulator 44.

When the oil pressure acting on the port C further increases, the spool 52 is further moved to open the passageway between the ports A and B, so that the hydraulic oil fed to the second gear hydraulic clutch 14 is returned to the transmission control valve 3 through the hydraulic line 43, passageway between the ports A and B, and lines 41B and 41, and the oil pressure for the second gear hydraulic clutch 14 becomes zero.

Further, the change of speed from the second gear to the third gear or fourth gear is likewise effected, and so is the gear shift from other speed gears.

According to the above operation, the momentary drop of oil pressure (presence of the time t) that has occurred during a gear shift by means of speed gear hydraulic clutches 13–16 can be eliminated to ensure that sufficient torque is fed to the truck during the gear shift, thereby preventing torque loss. Thus, a feeling of torque loss or a shock, and a feeling of uneasiness such as a feeling of reversing on an uphill slope, that have been given to an operator during the gear shift, can be eliminated.

(Third Embodiment)

Figure 6B:
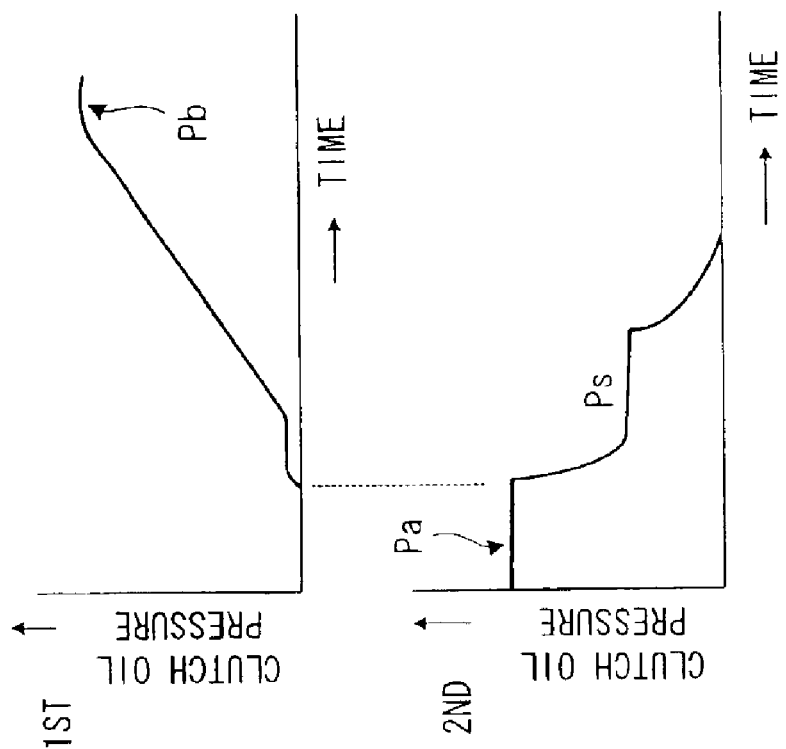
FIG. 6 is a characteristics diagram of clutch oil pressure in the clutch hydraulic mechanism.
Figure 6A:
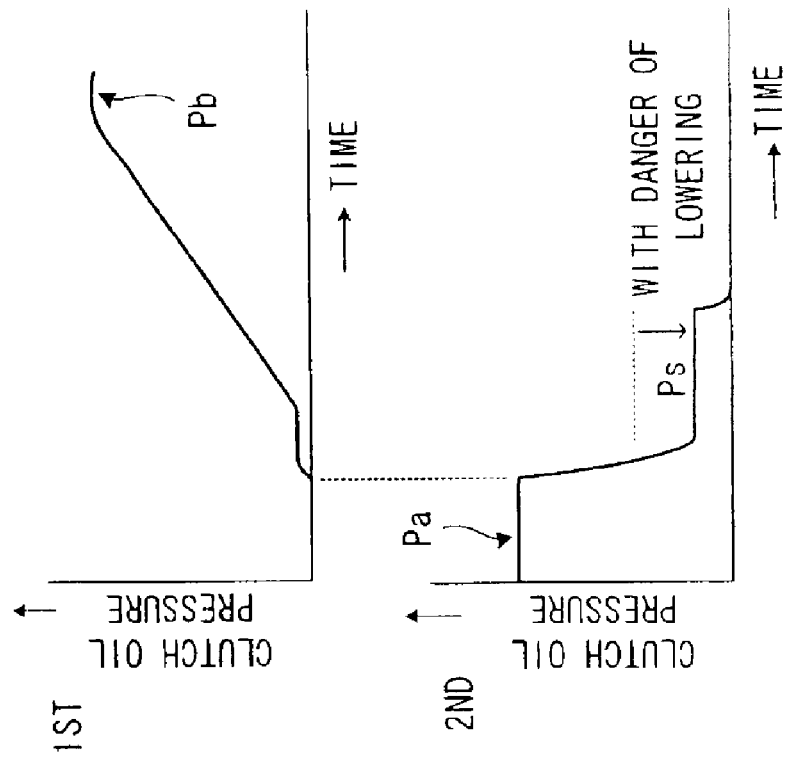

In the arrangement of the second embodiment described above, a length of time, though short, is required until the passageway between the ports A and B is closed, even if the spool 52 of the control spool 45 swiftly moves. In this short time before closure the hydraulic oil in the second gear hydraulic clutch 14 is discharged (or returned to the transmission control valve 3) through the lines 41B and 41, so that the pressure lowers below the preset pressure in the accumulator 44. For example, the pressure lowers from the set pressure of 12 kg/cm$^2$ in the accumulator 44 to 10 kg/cm$^2$. At this time, if the temperature of the hydraulic oil is high or the controller valve 45 has been machined with a tight manufacturing tolerance, or if there is much leakage of hydraulic oil from the hydraulic circuit of the first gear hydraulic clutch 13, the third gear hydraulic clutch 15 or the fourth gear hydraulic clutch 16, the short length of time before the closure becomes longer than the normal length of time, so that as shown in FIG. 6a, the shelf-like oil pressure waveform Ps has the danger of lowering to the extent that it is no longer effective to provide the torque loss prevention effect.

The third embodiment is intended to eliminate such danger.

Figure 5:
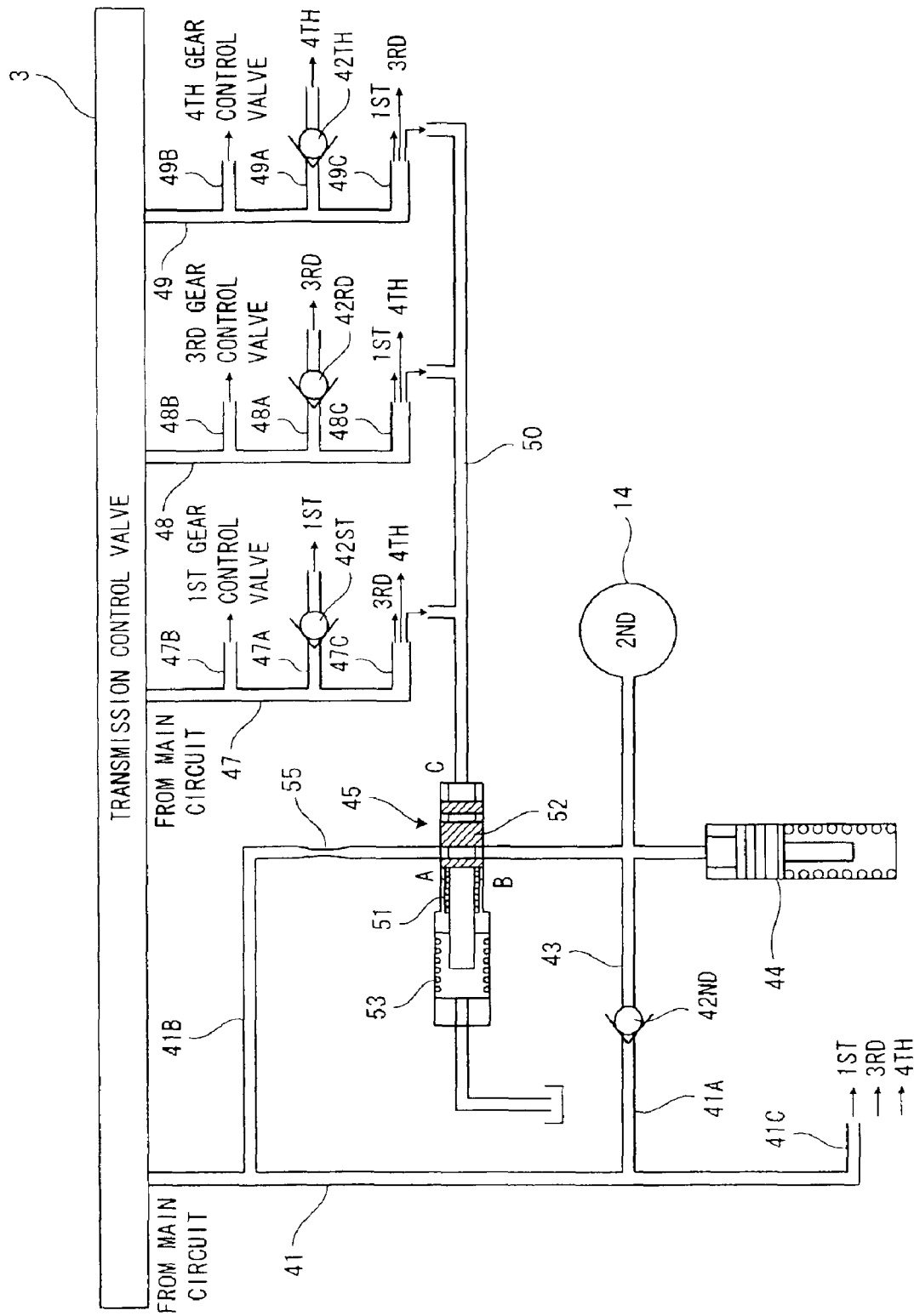
FIG. 5 is a hydraulic circuit diagram of a transmission provided with a clutch hydraulic mechanism in a third embodiment of the invention.

FIG. 5 shows a transmission hydraulic circuit having a clutch hydraulic mechanism in the third embodiment of the invention, with an orifice 55 newly inserted in a hydraulic line 41B in the hydraulic circuit of the second embodiment. In addition, the other first gear (1ST) hydraulic clutch 13, third gear (3RD) hydraulic clutch 15, and forth gear (4TH) hydraulic clutch 16 are of similar construction.

Operation of the above arrangement will now be described.

In the case where speed is changed to the second gear, the hydraulic oil from the transmission control valve 3 is fed to the second gear hydraulic clutch 14 while filling the accumulator 44 through the hydraulic lines 41, 41A and 43, and check valve 42ND, thereby increasing the pressure for the second gear hydraulic clutch 14.

In this state, if speed is changed to the first gear, for example, the hydraulic oil from the transmission control valve 3 is fed to the first gear hydraulic clutch 13 through the hydraulic lines 47 and 47A, and check valve 42ST, thus increasing the pressure for the first gear hydraulic clutch 13 to change speed to the first gear. Further, simultaneously therewith, hydraulic oil is fed to the port C of the control spool 45 for the second gear hydraulic clutch 14 through the hydraulic lines 47, 47C and 50; thus, when oil pressure is applied to the port C, even a low oil pressure (e.g., 2 kg/cm$^2$) existing in the initial phase of modulation causes the spool 52 to move swiftly against the force of the spring 51, because the latter has been set weakly, so that the passageway between the ports A and B is closed, that is, spool 52 closes the port B; closing the hydraulic line 43.

Thereupon, the hydraulic oil fed to the second gear hydraulic clutch 14 has its escape route cut off by the check valve 42ND and the spool 52 of the control spool 45, so that a shelf-like oil pressure waveform Ps is formed by the set pressure of the accumulator 44. At this time (until the passageway between the ports A and B is closed), the discharge of hydraulic oil in the second gear hydraulic clutch 14 is suppressed by the orifice 55, whereby a stabilized shelf-like oil pressure waveform Ps is formed, as shown in FIG. 6b.

Without the orifice 55, as described above, the shelf-like oil pressure waveform Ps would lower (FIG. 6a) and there would be the danger of the torque loss prevention effect becoming insufficient.

Further, when the oil pressure on the port C is increased, the spool 52 is further moved to open the passageway between the ports A and B, so that the hydraulic oil fed to the second gear hydraulic clutch 14 is returned to the transmission control valve 3 through the hydraulic line 43, the passageway between the ports A and B, and lines 41B and 41, with the oil pressure for the second gear hydraulic clutch 14 becoming zero.

Further, the gear shift from the second gear to the third gear or fourth gear is likewise effected and so is the gear shift from other speed gears.

According to the above operation, the drop of oil pressure (presence of the time t) that has occurred during the gear shift by means of speed gear hydraulic clutches 13–16 can be eliminated to ensure that sufficient torque is fed to the truck during the gear shift. Further, the insertion of the orifice 55 in the hydraulic line 41B to discharge the hydraulic oil in the clutch makes it possible to obtain a stabilized shelf-like oil pressure waveform Ps during switching between clutches necessary for torque loss prevention. Thus, a feeling of torque loss or a shock, and a feeling of uneasiness such as a feeling of reversing on an uphill slope, that have been given to an operator during the gear shift, can be reliably eliminated.

(Fourth Embodiment)

In the arrangement of the second embodiment described above, the control spool 45 is of complicated construction using two springs 51 and 53. The fourth embodiment is intended to achieve the same effect with a control spool of simple construction.

Figure 7:
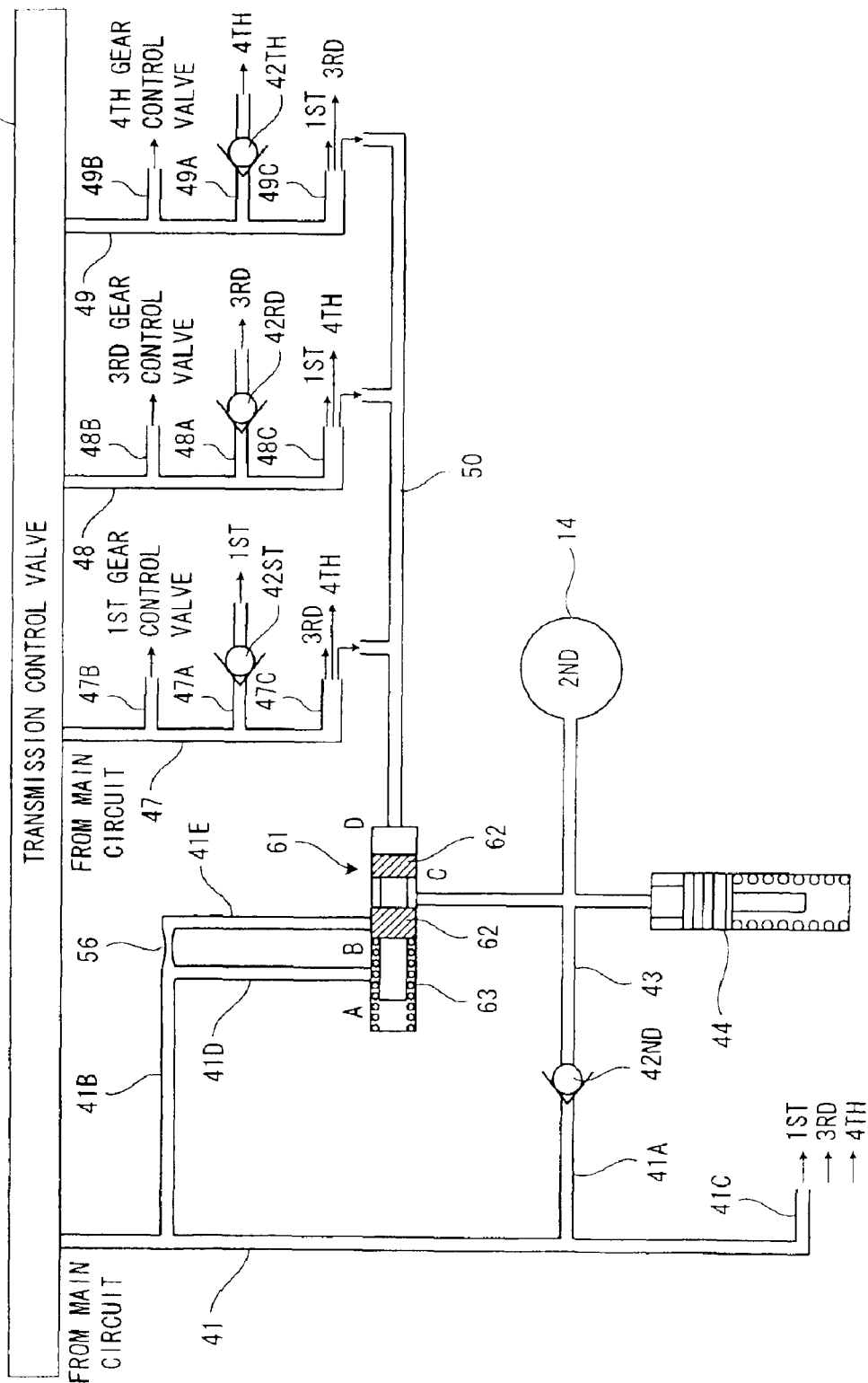
FIG. 7 is a hydraulic circuit diagram of a transmission provided with a clutch hydraulic mechanism in a fourth embodiment of the invention.

FIG. 7 is a transmission hydraulic circuit having a clutch hydraulic mechanism in the fourth embodiment of the invention.

FIG. 7 shows a clutch hydraulic mechanism for the second gear (2ND) hydraulic clutch 14. The same parts as those shown in FIG. 3 of the second embodiment are given the same reference characters to omit a description thereof. In addition, the other first gear (1ST) hydraulic clutch 13, third gear (3RD) hydraulic clutch 15, and forth gear (4TH) hydraulic clutch 16 are of similar construction.

A hydraulic line 41B is divided into two, hydraulic lines 41D and 41E, one hydraulic line 41D being connected to the port A of a control spool 61, the other hydraulic line 41E being connected to the port B of the control spool 61 through an orifice 56. Further, a hydraulic line 43 is connected to the port C of the control spool 61 and a hydraulic line 50 is connected to the port D of the control spool 61.

The control spool 61 is so designed that when oil pressure is applied to the port D, a spool 62 is moved against a spring 63. In a state in which no oil pressure is applied to the port D, the port B is closed by the spool 62, with the ports A and C being opened, and when the oil pressure on the port D is increased, the spool 62 is moved against the spring 63 to provide communication between the ports C and B.

The operation of the above arrangement will be described.

In the case where the speed is changed to the second gear, the hydraulic oil from the transmission control valve 3 is fed to the second gear hydraulic clutch 14 while filling the accumulator 44 through the hydraulic lines 41, 41A and 43 and check valve 42ND, thus increasing the pressure for the second gear hydraulic clutch 14. Further, the control spool 61 is filled with hydraulic oil either from the port A through the hydraulic lines 41B and 41D or from the port C through the hydraulic line 43.

In this state, if the speed is changed to the first gear, for example, the hydraulic oil from the transmission control valve 3 is fed to the first gear hydraulic clutch 13 through the hydraulic lines 47 and 47A and check valve 42ST. Simultaneously therewith, the hydraulic oil is fed to the port D of the control spool 61 through the hydraulic lines 47, 47C and 50.

Figure 8:
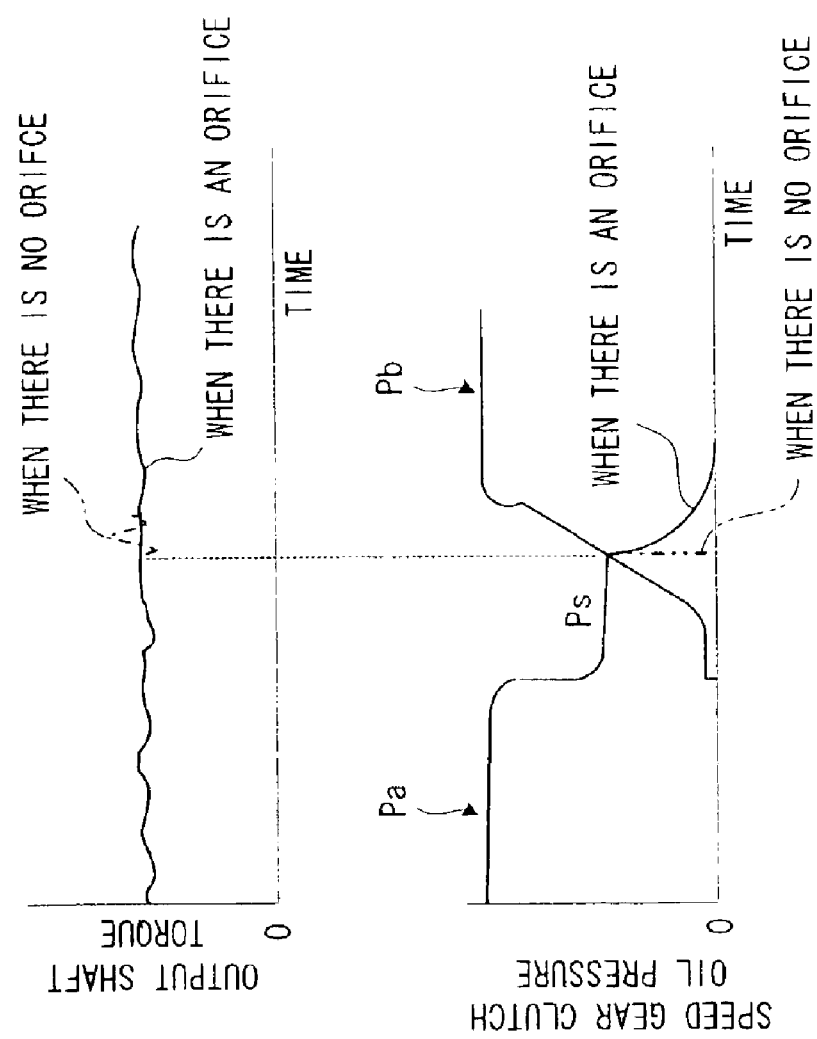
FIG. 8 is a characteristics diagram of clutch oil pressure versus output shaft torque in the clutch hydraulic mechanism.

Further, the hydraulic oil in the lines 41, 41A, 41B, 41D and 41E through which oil pressure has been fed to the second gear is returned to the transmission control valve 3, and the oil pressure of the second gear hydraulic clutch 14 tends to quickly lower to zero, but the shelf-like oil pressure waveform Ps shown in FIG. 8 is obtained by means of the set pressure (for example, 10 kg/cm$^2$) of the accumulator 44.

Subsequently, when the oil pressure for the first gear hydraulic clutch 13 is increased, the speed is changed to the first gear and the spool 62 of the control spool 61 is gradually moved against the spring 63, providing communication between the ports C and B.

Thereupon, the hydraulic oil fed to the second gear hydraulic clutch 14 and the hydraulic oil filled in the accumulator 44 is returned to the transmission control valve 3 through the hydraulic line 43, passageway between ports C and B, lines 41E, 41B and 41, and the oil pressure for the second gear hydraulic clutch 14 becomes zero. At this time, as shown in FIG. 8, the discharge of hydraulic oil in the second gear hydraulic clutch 14 is suppressed by the orifice 56, so that the second gear hydraulic clutch 14 is smoothly disengaged; thus, the delivery of power to the first gear hydraulic clutch 13 is smoothed, and variations in the output shaft torque become smoother.

In addition, without the orifice 56, the oil pressure for the second gear hydraulic clutch 14 will sharply lower from oil pressure Ps to zero, as shown in a chain double-dashed line in FIG. 8, so that the output shaft torque would be varied as shown in a chain double-dashed line.

Further, the change of speed from the second gear to the third gear or fourth gear is likewise effected, and so is the speed gear shift from other speed gears.

According to the above operation, as in the case of the second embodiment using the control spool 61 of simple construction, the drop of oil pressure (presence of the time t) that has occurred during the gear shift by means of speed gear hydraulic clutches 13–16 can be eliminated to ensure that sufficient torque is fed to the truck during the gear shift. Further, the insertion of the orifice 56 in the hydraulic line 41E which discharges the hydraulic oil in the clutch prevents torque fluctuation. Thus, a feeling of torque loss or a shock, and a feeling of uneasiness such as a feeling of reversing on an uphill slope, that have been given to an operator during the gear shift, can reliably be eliminated.

What is claimed is:

1. A clutch hydraulic mechanism for switching between speed gear hydraulic clutches corresponding to an operation of a clutch operating lever, the mechanism being employed in industrial trucks using torque converters, the improvement comprising:

a check valve provided for each of the speed gear hydraulic clutches, said check valve being installed in a hydraulic line for hydraulic oil being fed to the speed gear hydraulic clutch;

an accumulator provided for each of the speed gear hydraulic clutches, said accumulator being disposed between the check valve and the speed gear hydraulic clutch and accumulating some amount of the hydraulic oil therein;

a control spool provided for each of the speed gear hydraulic clutches, said control spool being operated by the hydraulic oil fed to the speed gear hydraulic clutch shifted from another speed gear and cooperating with the check valve to hold, for a predetermined period of time, the hydraulic oil accumulated in the accumulator; and an orifice provided for each of the speed gear hydraulic clutches, said orifice being inserted in the hydraulic line for releasing the hydraulic oil held by the control spool from the control spool, thereby suppressing discharge of the hydraulic oil.

* * * * *